E. K. THOMASON.
ROLLER BEARING ECCENTRIC.
APPLICATION FILED APR. 15, 1919.
1,333,883. Patented Mar. 16, 1920.
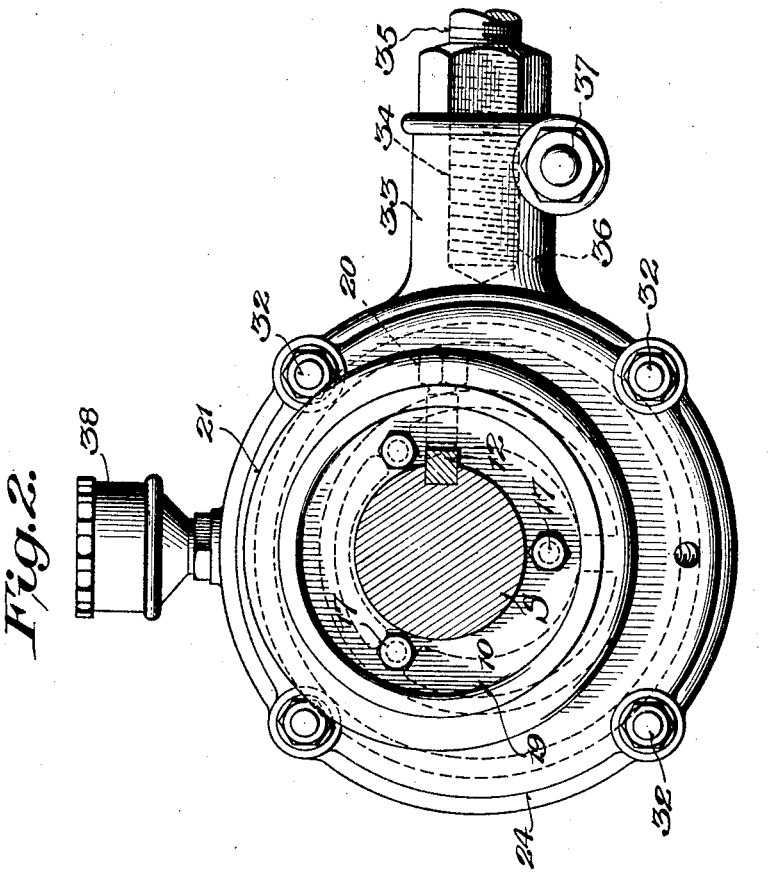
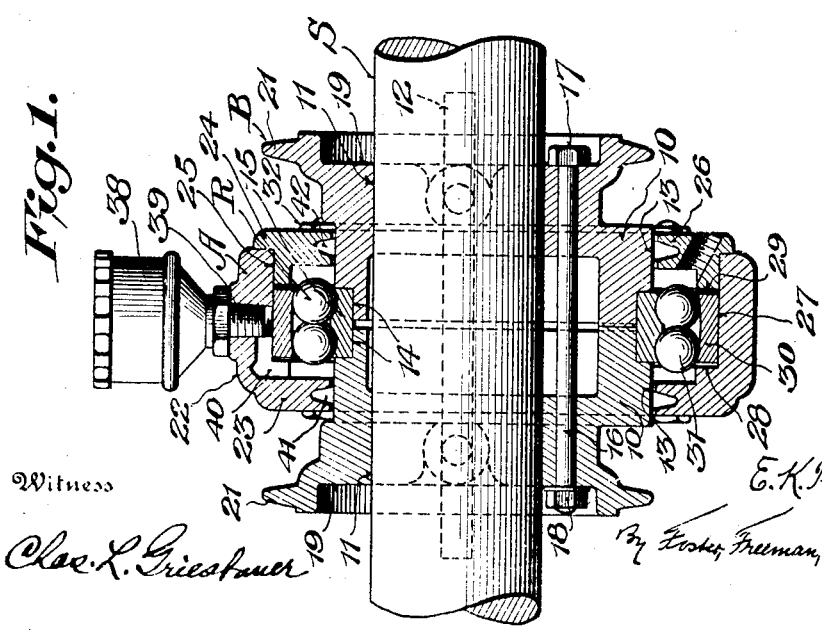

UNITED STATES PATENT OFFICE.

ERNEST K. THOMASON, OF EAST POINT, GEORGIA, ASSIGNOR TO ATLANTA UTILITY WORKS, OF EAST POINT, GEORGIA, A CORPORATION OF GEORGIA.

ROLLER-BEARING ECCENTRIC.

1,333,883.   Specification of Letters Patent.   Patented Mar. 16, 1920.

Application filed April 15, 1919. Serial No. 290,253.

*To all whom it may concern:*

Be it known that I, ERNEST K. THOMASON, a citizen of the United States, residing at East Point, Fulton county, State of Georgia, have invented certain new and useful Improvements in Roller-Bearing Eccentrics, of which the following is a specification.

The present invention relates to roller bearing eccentrics.

The objects of the invention are to provide an eccentric of this type in which the roller bearing is of relatively small diameter and the parts may be manufactured and assembled easily. Other features and objects of novelty will be apparent from the description taken in connection with the drawings in which:

Figure 1 is a sectional elevation through an eccentric constructed in accordance with the present invention; and Fig. 2 is a side elevation of the eccentric, the shaft on which it is mounted being shown in section.

Referring to the drawings the eccentric as shown comprises an eccentric block B mounted on a shaft S, a strap assembly A, and a roller bearing R interposed between these parts.

According to this invention the block comprises two circular elements 10 formed with alined bores 11 to receive the shaft S, these elements and the shaft being formed with coöperating keyways to receive the key 12, whereby the elements are secured to the shaft for rotation therewith. The peripheral surfaces of the elements at their adjacent ends are cylindrical as indicated at 13 and eccentric to the axis of the bores 11. The adjacent ends of the elements 11 are rabbeted so that when they are assembled on the shaft to form the block B an annular groove 14 is formed which is adapted to receive the inner race ring 15 of the roller bearing R. The width of this race ring 15 is slightly greater than the width of the groove 14 when the two elements 11 have their ends in contact. They are therefore slightly separated in order to accommodate the said race ring 15. For the purpose of securing the ring against displacement it is clamped between the two elements 10 by bolts 16 extending lengthwise through the elements. The heads 17 and nuts 18 of these bolts are disposed within a recess 19 formed in the outside ends of the elements 10. These heads and nuts are, therefore, more or less hidden and do not project outside of the outlines of the eccentric block to become a menace. The annular groove 14 is concentric with the cylindrical surfaces 13 and is therefore eccentric to the axis of the shaft.

In order to securely hold the key 12 in place each of the elements 10 has a set screw 20 which engages the top of the key. In order that these set screws may not be features of danger each of the elements 10 has a radial flange 21 substantially at its outer end, the periphery of which is of substantially the same radius as the distance from the head of the set screw 20 to the axis of the shaft. Consequently the heads of the set screws do not project radially farther away from the axis of the shaft than the flanges 21 and the flanges thus act to prevent objects from catching on the revolving set screws.

The strap assembly A, as shown, comprises a main ring 22 which has an integral radial inwardly extending flange 23, the inner periphery of which is adjacent the cylindrical surface 13 of the block B. A cap or cover plate 24 is disposed at the end of the ring 22 opposite the flange 23 and is formed with a rabbeted seat 25 for the said end of the ring 22. The cap 24 also has an inwardly extending flange 26, the inner periphery of which is disposed adjacent the cylindrical surface 13 on the block B. In this manner an annular channel or groove 27 is formed on the interior of the ring 22, one side of this groove being formed by the shoulder 28 on the ring and the other side being formed by the end surface 29 of the cap. An outer race ring 30 is disposed in this groove 27 and preferably the width of the groove is slightly greater than the width of the race ring so that the race ring may adjust itself longitudinally of the strap. Suitable rollers 31 are interposed between the two race rings. The main ring and cap of the strap assembly are held together by the bolts 32 extending lengthwise through these two parts. The main ring 22 is provided with a boss 33 formed with the threaded bore 34 to receive the threaded end of the eccentric rod 35. The boss may be split longitudinally, as indicated by the dotted line 36, and clamped on the end of the rod 34 by means of the clamp bolt 37.

The eccentric may be lubricated in any suitable manner. As shown a lubricant cup 38 has its nipple 39 screwed into the main ring 22 of the strap and the nipple communicates with the passage 40 formed in the ring and leading to the roller bearing.

The inner peripheries of the flanges 23 and 26 may be formed with the grooves 41 and 42 respectively to receive packing and prevent lubricant working outside the strap.

The eccentric block B may be manufactured from a single casting in which the groove 14 is machined of slightly less width than the inner race ring of the roller bearing. Then the casting may be divided into two parts to provide the elements 10; or the block may be made from two elements 10.

In assembling the parts of the eccentric the roller bearing is positioned in the main ring 22 of the strap and then held in place by attaching the cap 24. The assembled strap with the bearing is then slipped over one of the elements 10 and thereafter the other element 10 is pushed into position and the two elements secured together by the bolts 16.

It is to be understood that the invention is not limited to the exact details shown but includes modifications and changes which come within the scope of the appended claims.

Having thus described the invention what is claimed as new and desired to be secured by Letters Patent is:—

1. A roller bearing eccentric comprising in combination, a circular block having a bore to receive a shaft and formed with a peripheral annular groove eccentric to the axis of said bore, an eccentric strap surrounding said block and provided with an interior annular groove, a roller bearing disposed between said block and strap comprising an inner race ring disposed in the groove in the block, an outer race ring disposed in the groove in the strap and coöperating rollers, one of said race rings being secured in its groove and the other having a slight longitudinal play therein.

2. A roller bearing eccentric comprising in combination, a block consisting of two circular elements formed with alined bores to receive a shaft, an inner race ring clamped between said elements with its axis eccentric to the axis of the bore, a strap surrounding said inner race ring in spaced relation, an outer race ring carried by said strap for slight relative longitudinal movement, and rollers interposed between said race rings.

3. A roller bearing eccentric comprising in combination a block formed with a bore to receive a shaft, an inner race ring carried by said block eccentric to the axis of said bore, a strap comprising a ring having an interior cylindrical surface and a cover, said cylindrical surface having a shoulder spaced axially from the edge of the cover thereby forming a groove, an outer race ring seated in the groove in said strap, the width of the groove being slightly greater than the width of the ring whereby said outer ring may have a slight longitudinal play, and rollers disposed between said race rings.

4. A roller bearing eccentric comprising in combination, a block consisting of two circular elements having alined bores, an inner race ring disposed between said elements with its axis eccentric to the bore axis, bolts extending lengthwise through the elements to clamp said ring, the outside ends of said elements being recessed for the heads and nuts of the bolts, a strap comprising a main ring and a cover ring, an outer race ring disposed in an annular groove formed by said strap rings, bolts extending lengthwise through said strap rings, said elements each having a set screw to secure it to a shaft and a radial flange at its outside end, the periphery of which is radially outside the head of the set screw whereby the flanges afford protection against injury from the projecting set screws.

5. A roller bearing eccentric including in combination, an eccentric block comprising two elements formed with alined bores and each having a cylindrical surface eccentric to the bore axis, an inner race ring clamped between the adjacent ends of said elements concentrically with said surfaces, a strap comprising a main ring and a cap each having a radial inwardly projecting flange, the inner periphery of which is disposed close to the cylindrical surface of one of said elements, an outer race ring carried by said strap and rollers associated with said race rings.

In testimony whereof I affix my signature.

ERNEST K. THOMASON.